United States Patent
Seo et al.

(10) Patent No.: US 7,570,872 B2
(45) Date of Patent: Aug. 4, 2009

(54) METHOD OF CREATING PLAYBACK CONTROL FILE FOR RECORDING MEDIUM AND METHOD AND APPARATUS FOR REPRODUCING DATA USING THE PLAYBACK CONTROL FILE

(75) Inventors: Kang Soo Seo, Anyang-si (KR); Byung Jin Kim, Seongnam-si (KR); Jea Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 10/998,945

(22) Filed: Nov. 30, 2004

(65) Prior Publication Data

US 2005/0117880 A1 Jun. 2, 2005

(30) Foreign Application Priority Data

Dec. 1, 2003 (KR) ...................... 10-2003-0086344

(51) Int. Cl.
*H04N 5/76* (2006.01)
(52) U.S. Cl. .......................... 386/95; 386/126
(58) Field of Classification Search .................. 386/68, 386/1, 46, 95, 112, 125, 126, 124
See application file for complete search history.

(56) References Cited

U.S. PATENT DOCUMENTS

| 2003/0133375 | A1 | 7/2003 | Yoshioka et al. |
| 2003/0215209 | A1 | 11/2003 | Kawaguchi |
| 2005/0175313 | A1* | 8/2005 | Takakuwa et al. .............. 386/1 |

FOREIGN PATENT DOCUMENTS

KR 1020020057441 7/2002

OTHER PUBLICATIONS

International Search Report Dated Jun. 27, 2005.

* cited by examiner

*Primary Examiner*—David E Harvey
(74) *Attorney, Agent, or Firm*—Harness, Dickey & Pierce, PLC (57) ABSTRACT

A method of creating a playback control file for a recording medium and a method and apparatus for reproducing data using the playback control file are disclosed. The method of creating a playback control file for a recording medium includes creating a virtual stream file designating a group of stream files recorded on the recording medium, and creating a PlayList being able to reproduce the group of stream files, individually or in combination, the PlayList including a PlayItem directly designating the virtual stream file and identification information designating at least one of elementary streams included in the group of stream files.

26 Claims, 8 Drawing Sheets

```
PID_table () {
    length
    number_of_PID_entries for (k=0; k< number_of_PID_entries; k++) {
        ref_to_stream_PID(k)
        attributes
    }
}
```

METHOD OF CREATING PLAYBACK CONTROL FILE FOR RECORDING MEDIUM AND METHOD AND APPARATUS FOR REPRODUCING DATA USING THE PLAYBACK CONTROL FILE

This application claims the benefit of the Korean Patent Application No. 10-2003-0086344, filed on Dec. 1, 2003, which is hereby incorporated by reference as if fully set forth herein.

BACKGROUND OF THE INVENTION

1. Field of the Invention

The present invention relates to a recording medium, and more particularly, to a method of creating a playback control file for a recording medium and method and apparatus for reproducing data using the playback control file. Although the present invention is suitable for a wide scope of applications, it is particularly suitable for creating a playback control file that enables data being recorded on the recording medium and data downloaded from an external source to be put to combined use, and for playing-back the playback control file.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, the blu-ray disc (BD), which is known to be the next generation recording medium technology, is under development as a next generation optical recording solution that is capable of having data significantly surpassing the conventional DVD, along with many other digital apparatuses.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since preferable playback (or reproducing) methods for reproducing a combination of the external input signal and the built-in blu-ray disc (BD) playback signal are not yet known and familiarized, there are many restrictions in the full-scale development of a blu-ray disc (BD)-based optical recording and/or reproducing apparatus. And, such restrictions cause problems in the field of reproducing the external input signal and the built-in blu-ray disc (BD) playback signal as one single reproducing unit.

SUMMARY OF THE INVENTION

Accordingly, the present invention is directed to a method of creating a playback control file for a recording medium and method and apparatus for reproducing data using the playback control file that substantially obviate one or more problems due to limitations and disadvantages of the related art.

An object of the present invention is to provide a method and apparatus for reproducing data using the playback control file that are suitable for a recording medium, such as a blu-ray disc (BD).

Another object of the present invention is to provide a method of creating a playback control file, which can playback a plurality of stream files recorded in the recording medium in combination, and to provide a method of controlling the playback control file and an effective playback method for a recording medium and recording medium using the playback control file.

A further object of the present invention is to provide a method of controlling and playing-back a Virtual PlayList file of a high density optical disc, wherein data recorded in a blu-ray disc (BD) and data downloadable from an external source are reproduced as standardized information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of creating a playback control file for a recording medium includes creating a virtual stream file designating a group of stream files recorded on the recording medium, and creating a PlayList being able to reproduce the group of stream files, individually or in combination, the PlayList including a PlayItem directly designating the virtual stream file and identification information designating at least one of elementary streams included in the group of stream files.

In another aspect of the present invention, a method of creating a playback control file for a recording medium includes creating a virtual stream file designating at least one original stream file recorded on the recording medium and at least one additional stream file downloadable from an external source, each original stream file comprising original elementary streams, and each additional stream file comprising additional elementary streams, and creating a PlayList being able to reproduce the at least one original stream file and the at least one additional stream file, individually or in combination, the PlayList including a PlayItem directly designating the virtual stream file and identification information designating at least one of the original and additional elementary streams.

In another aspect of the present invention, a recording medium includes a stream area storing a group of stream files and a virtual stream file designating the group of stream files, and a PlayList area storing a PlayList being able to reproduce the group of stream files, individually or in combination, the PlayList including a PlayItem directly designating the virtual stream file and identification information designating at least one of elementary streams included in the group of stream files.

In another aspect of the present invention, a recording medium includes a stream area storing at least one original stream file and a virtual stream file, the virtual stream file designating the at least one original stream file and at least one additional stream file downloadable from an external source, each original stream file comprising original elementary streams, and each additional stream file comprising additional elementary streams, and a PlayList area storing a PlayList being able to reproduce the at least one original stream file and the at least one additional stream file, individually or in combination, the PlayList including a PlayItem directly designating the virtual stream file and identification information designating at least one of the original and additional elementary streams.

In another aspect of the present invention, a method of reproducing data recorded on a recording medium includes creating a virtual stream file designating a group of stream files recorded on the recording medium, creating a PlayList including a PlayItem directly designating the virtual stream file and identification information designating at least one of elementary streams included in the group of stream files, and playing-back the PlayList so as to reproduce the group of stream files, individually or in combination.

In another aspect of the present invention, a method of reproducing data recorded on a recording medium includes creating a virtual stream file designating at least one original stream file recorded on the recording medium and at least one additional stream file downloadable from an external source, each original stream file comprising original elementary streams, and each additional stream file comprising additional elementary streams, downloading the at least one additional stream file from the external source, creating a PlayList including a PlayItem directly designating the virtual stream file and identification information designating at least one of the original and additional elementary streams, and playing-back the PlayList so as to reproduce the at least one original stream file and the at least one additional stream file, individually or in combination.

In another aspect of the present invention, an apparatus of reproducing data recorded on a recording medium includes a controller configured to create a virtual stream file designating a group of stream files recorded on the recording medium, and to create a PlayList including a PlayItem directly designating the virtual stream file and identification information designating at least one of elementary streams included in the group of stream files, wherein the controller plays-back the PlayList so as to reproduce the group of stream files, individually or in combination.

In a further aspect of the present invention, an apparatus of reproducing data recorded on a recording medium a data storage configured to store at least one additional stream file downloaded from an external source, and a controller configured to create a virtual stream file designating at least one original stream file recorded on the recording medium and the at least one additional stream file, each original stream file comprising original elementary streams, and each additional stream file comprising at least one additional elementary streams, the controller being further configured to create a PlayList including a PlayItem directly designating the virtual stream file and identification information designating at least one of the original and additional elementary streams, wherein the controller plays-back the PlayList so as to reproduce the group of stream files, individually or in combination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

Figure 1:
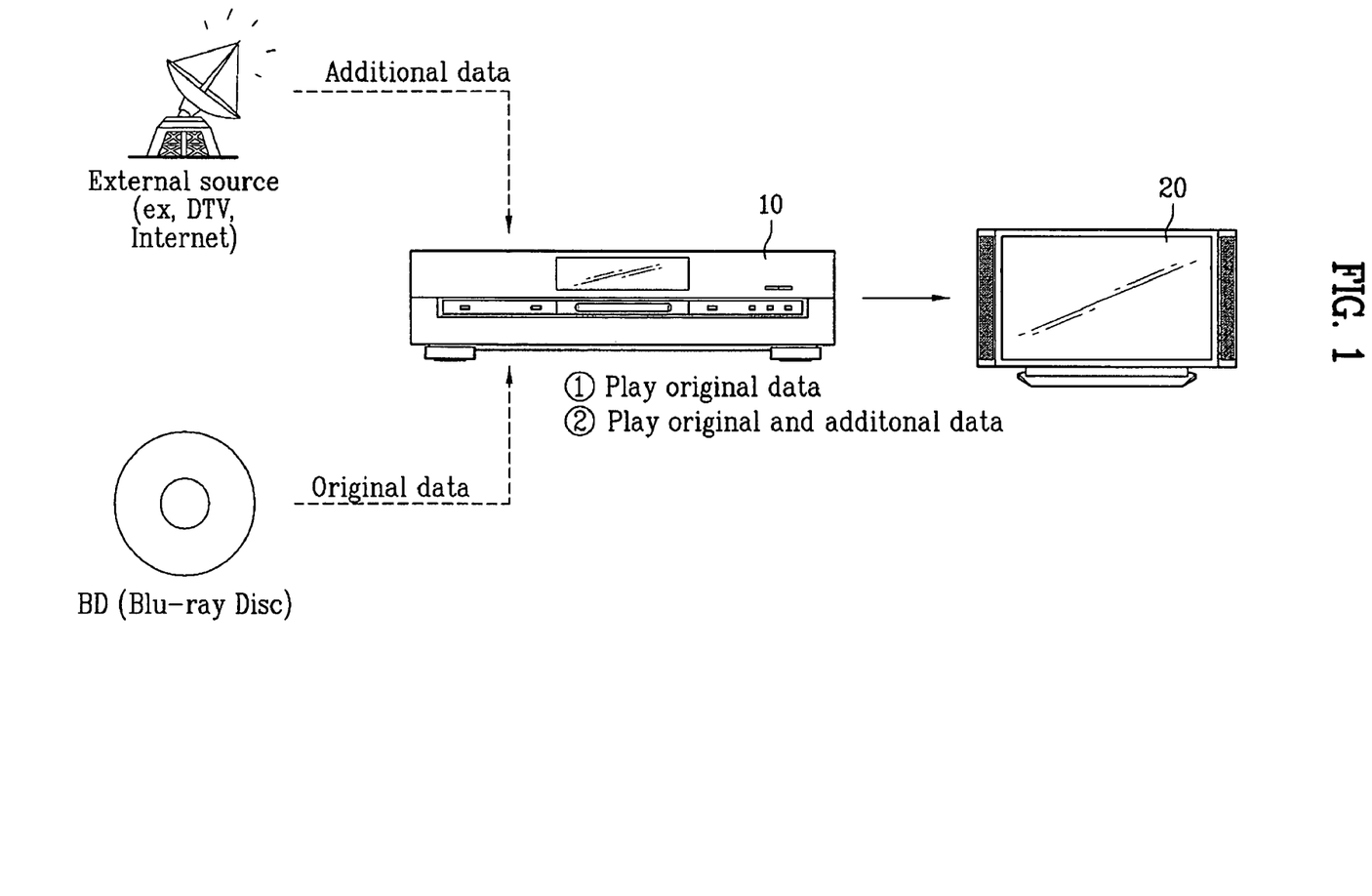
FIG. 1 illustrates a general view of the present invention.

FIG. 1 illustrates a general view of the present invention, which shows an example of a combined usage between an optical recording and/or reproducing apparatus 10 and peripheral apparatuses. The optical recording and/or reproducing apparatus 10 according to the present invention is an apparatus for recording and/or reproducing optical disc of various standards (or sizes). The optical recording and/or reproducing apparatus 10 may be designed to record and/or reproduce optical disc of a specific standard (e.g., a blu-ray disc (BD)). Alternatively, the apparatus may also be designed to only have a reproducing function and no recording function. However, considering the completion of the blu-ray disc (BD) standard and its connection with the peripheral apparatuses, either a BD-Player reproducing the blu-ray disc (BD) or a BD-Recorder recording and/or reproducing the blu-ray disc (BD) will be used as an example in the description of the present invention.

Apart from the function of recording and/or reproducing the disc, the optical recording and/or reproducing apparatus is also provided with a function of receiving an external input signal, processing the received signal, and transmitting the processed signal to a user through another external display 20. In this case, there are no limitations in the external signals that can be inputted, however, digital television (DTV) broadcast programs and the Internet are the most typical types of external signals. Most particularly, since the Internet is presently a medium that can be easily accessed by the public, users can make use of specific data provided on the Internet by downloading such data through the optical recording and/or reproducing apparatus.

The present invention seeks to efficiently reproduce data, when the data that is to be reproduced is separated into a plurality of stream files. More particularly, when seeking to effectively reproduce a plurality of separated stream files form the original data recorded on the optical disc (BD), the original data and the additional data are also combined and reproduced. Additionally, when original data is recorded on the optical disc (BD), which is loaded in the optical recording and/or reproducing apparatus 10, and additional data related to the original data is downloadable from an external source, the original data and the additional data are also combined and reproduced.

More specifically, when the original data seeking to be reproduced is separated into a plurality of stream files, such as a video stream of for a film dubbed in Korean, an audio stream (in Korean), and audio stream (in English) for the original film in English, and a graphic stream, the user may wish to reproduce the above stream files in combination. Alternatively, for example, when a video stream and an audio stream (both in Korean) for a film dubbed in Korean are recorded as the original data on the optical disc, and when an audio stream (in English) for the original film in English exists on the Internet as the additional data, a user may, if desired, download the audio stream (in English), which is the additional data existing on the Internet and reproduce the downloaded audio stream (in English) along with the video stream within the original data. In order to meet with the demands of the user, a file structure for reproducing the original data and/or the additional data needs to be determined, and a systematic method for controlling and reproducing such data as desired by the user is also required.

As aforementioned, the signal recorded within the disc is referred to as the original data and the signal existing in the external source is referred to as the additional data, for simplicity. However, such terms may vary depending upon the method of acquiring the data and are not limited to any specific type of data. Therefore, the additional data generally includes audio data, presentation graphic data, subtitle data, interactive graphic data, and so on. And, without being limited to the above-mentioned examples, it is possible to propose a combination of the original data and the additional data, wherein an audio stream (in English) is the original data and a video stream is the additional data. In order to meet with the demands of the user, a file structure for reproducing the original data and the additional data is required, which will be described in detail with reference to FIGS. 2 and 4.

Figure 2:
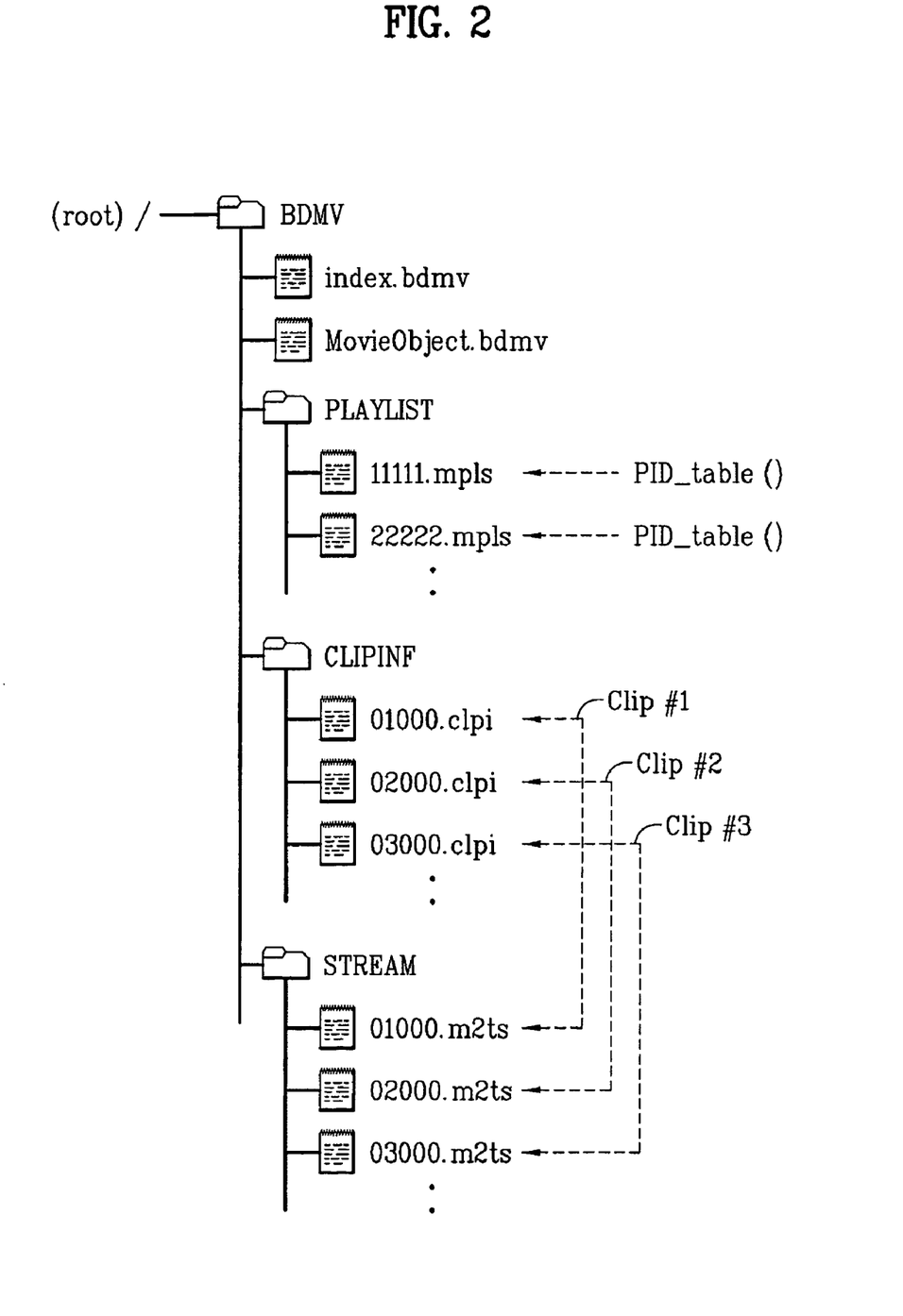
FIG. 2 illustrates a file structure being recorded on an optical disc, the optical disc being a recording medium, according to the present invention.

Referring to FIG. 2, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes diverse information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF).

The stream directory includes audio/video (AV) stream (hereinafter referred to as "AV stream") files. More specifically, the AV streams (01000.m2ts, 02000.m2ts, 03000.m2ts) may generally be in the form of MPEG2 transport packets and be named as "*.m2ts". Therefore, unless the files are recorded in the MPEG-2 transport packet form, a different file extension may also be used. Moreover, with as the coding technology is actually being developed into many formats, the AV stream is not necessarily limited to the MPEG-2 transport packet form. In the BD standard, the AV stream is referred to as a clip stream file, and in the description of the present invention, the "original data" and the "additional data" will be formed as AV stream files.

Further, the clip information directory (CLIPINF) includes clip information files (01000.clpi, 02000.clpi) being in one-to-one correspondence with the AV stream files included in the stream directory. A clip information file (*.clpi) includes property information and timing information of a corresponding AV stream, wherein the timing information includes mapping information that maps presentation time stamp (PTS) with source packet number (SPN) using entry point map. In the BD standard, each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip (Clip #1). And, similarly, 02000.clpi and 02000.m2ts form another clip (Clip #2), and 03000.clpi and 03000.m2ts form another clip (Clip #3). Hereinafter, the clip will be referred to as a "stream file" in order to simplify the description of the present invention.

Referring back to FIG. 2, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating beginning and ending times (In-Time and Out-Time) for reproduction of a specific original clip, which may be designated by clip_Information_File_name within the PlayItem. Accordingly, a PlayList file (*.mpls) represents a basic playback control file for playing-back a desired clip from a combination of one or more PlayItems. Therefore, by providing a PlayItem appropriate for a corresponding playback purpose within the PlayList file (*.mpls), special playback functions, such as trickplay, skipplay, slideshow, and so on, can also be executed.

Accordingly, the above-described playback control file within the disc according to the present invention refers to the PlayList file (*.mpls) and the clip information file (*.clpi). However, the clip information file (*.clpi), along with the stream file (*.m2ts), is provided either to the original clip or to the additional clip. Accordingly, in order to combine and playback the plurality of streams into a single playback unit, an independent PlayList file (*.mpls) is required. Hereinafter, the playback control file will be described with reference to the PlayList file (*.mpls) as the example. Furthermore, a control information (or identification information) allowing a specific data within a clip, which the user wishes to reproduce, to be selected is generally recorded at a specific location within the PlayList file. Such control information is referred to as a "Packet Identifier_Table (PID_Table)", or "Playable_PID_entries".

Figure 3:
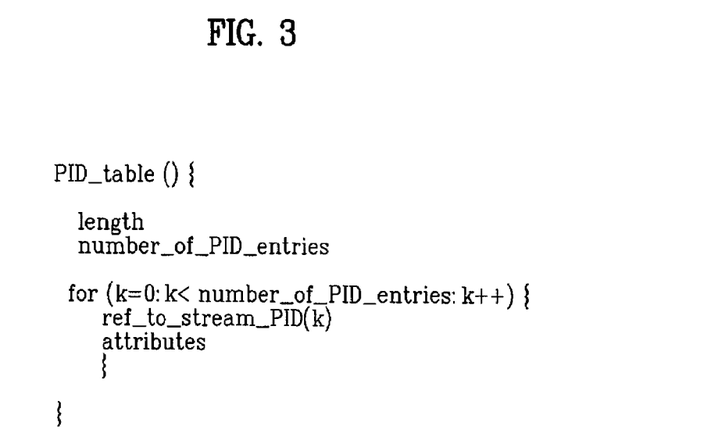
FIG. 3 illustrates a data structure of a PID_Table, the PID_Table being the playback control file of the recording medium according to the present invention.

Generally, PID is information being recorded on an MPEG-2 transport stream, wherein an identical ID is given to an identical packet so as to allow an AV decoder (numeral 17 of FIG. 7) to selectively decode a packet having an identical PID value. Therefore, the PID table is a type of control information for controlling the PID information in the form of a table. And, when a user desires to selectively reproduce an elementary stream data within the plurality of stream files, the PID table may be used as reference information. Accordingly, FIG. 3 illustrates an example of a data structure of the PID table, which is recorded on a specific location within the PlayList file. Herein, the PID table is formed of PID_entries, and each of the PID_entries includes a corresponding ref_to_stream_PID(k), and attributes. In other words, since an object of the present invention is to effectively control and reproduce data selected for reproduction, when the selected data is separated into a plurality of stream files (clips). More specifically, the plurality of stream files is bound together so as to create a single virtual stream file, and a PID_Table is recorded as control information for selectively reproducing the data within the single virtual stream file. Furthermore, when the original data within the optical disc and the additional data within the external source are to be reproduced in combination, a new PID_Table may be proposed as a composite control information.

Figure 4:
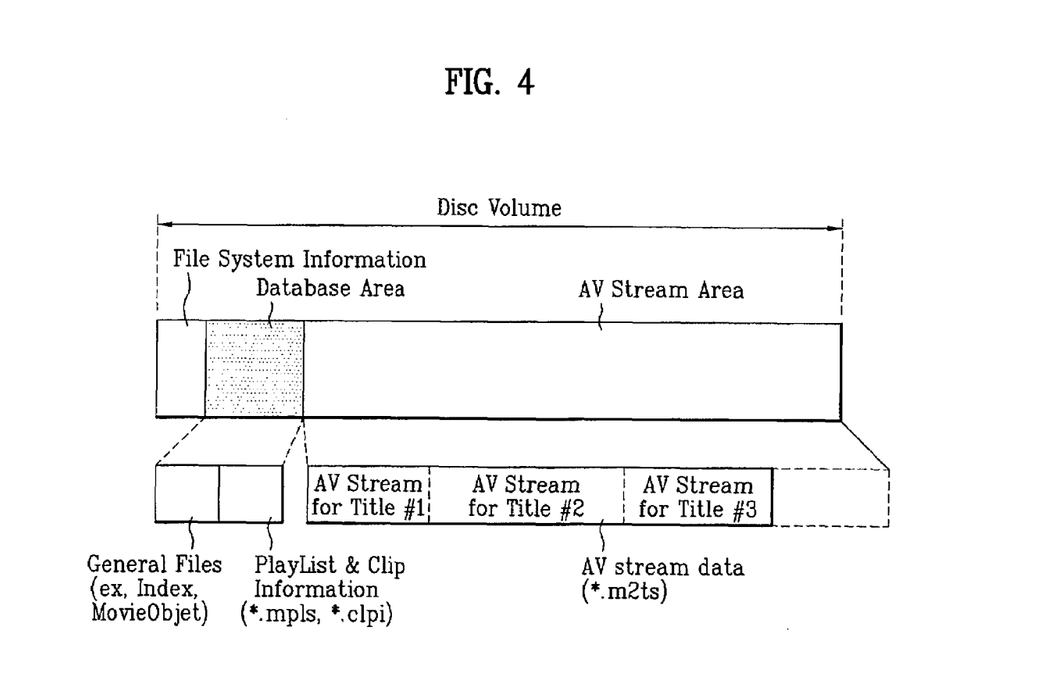
FIG. 4 illustrates a data recording structure being recorded on the optical disc, the optical disc being the recording medium, according to the present invention.

FIG. 4 illustrates a data recording structure being recorded on the optical disc, the optical disc being the recording medium, according to the present invention. Starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, original data such as audio/video/graphic data are recorded in the AV stream area. The general files, PlayList files, and clip information files are recorded in the database area of the disc volume. Most particularly, as described above, the data recorded in the AV stream area within the disc is referred to as the original data. Therefore, by using the information within the database area, a user is able to select an AV stream, which the user desires to reproduce, and decide and use the appropriate reproducing method of the selected AV stream.

Hereinafter, examples of the method of creating the playback control file of the recording medium according to the present invention and, more particularly, examples of creating a single virtual stream file, thereby so as to create a playback control file (e.g., a PlayList) including control information (i.e., PID_Table). Accordingly, two examples are proposed in the description of the present invention. More specifically, in the first example, all of the data selected for reproduction are included within the optical disc (shown in FIGS. 5A and 5B). And, in the second example, among the selected data for reproduction, at least one set of data is downloadable from the external source (shown in FIGS. 6A and 6B).

Figure 5A:
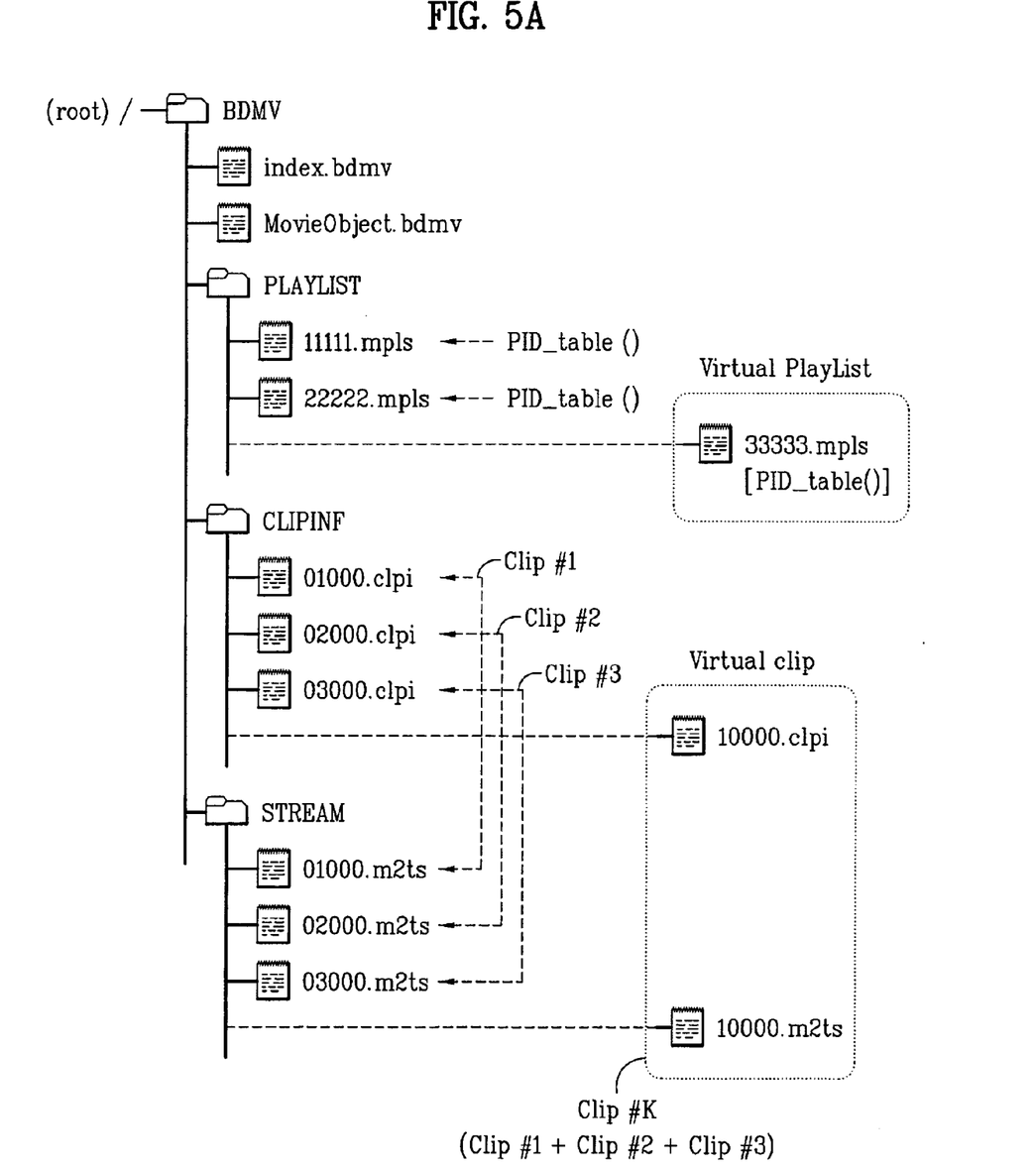
FIGS. 5A and 5B illustrate a method of creating a playback control file for the recording medium according to a first embodiment of the present invention.
Figure 5B:
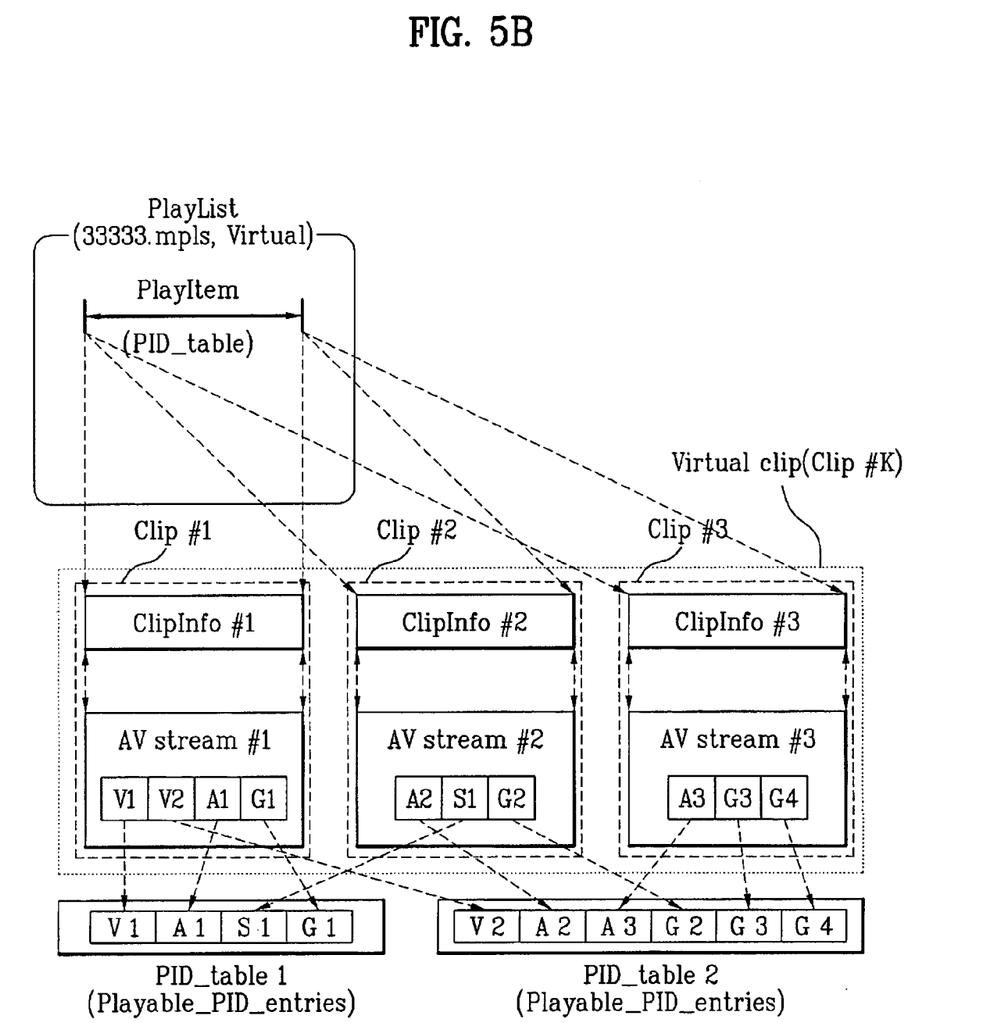

FIGS. 5A and 5B illustrate a method of creating a playback control file for an optical disc according to a first embodiment of the present invention, where all the clips (stream files) that need to be reproduced are included in the optical disc.

FIG. 5A illustrates a file structure of the data files according to the first embodiment of the present invention, and herein, the same file structure described in FIG. 2 is used for simplicity of the description. Referring to FIG. 5A, a group of clips (Clip #1, Clip #2, and Clip #3) are recorded on the optical disc. A virtual clip (Clip #k) is created so as to reproduce the group of clips individually or in combination. The virtual clip includes a virtual stream file (10000.m2ts) and a virtual clip information file (10000.clpi). The virtual stream file does not include any of the stream files (01000.m2ts, 02000.m2ts, and 03000 m2ts) that belong to the group of clips, but it rather simply includes information (e.g., a list of file names) designating these clips. Similarly, the virtual clip information file does not include any of the clip information files (01000.clpi, 02000.clpi, and 03000clpi) that belong to the group of clips, but it includes information designating them.

In addition, a virtual PlayList file (33333.mpls) is also created so as to reproduce the group of clips, individually or in combination. The virtual PlayList file includes a PID table designating at least one of elementary streams included in the group of stream files. The virtual PlayList file functions as a playback control file for reproducing the group of clips recorded on the optical disc.

Referring back to FIG. 5A, a normal PlayList file (11111.mpls or 22222.mpls), which are configured to reproduce at least one of the clips recorded on the disc, is recorded on the optical disc. The basic functions of the virtual PlayList file and the normal PlayList file are identical. Accordingly, the normal PlayList may be named as a "first type PlayList", and the virtual PlayList may be named as a "second type PlayList."

In addition, predicting the future usage, the manufacturer may record the newly created virtual clip (Clip #k) and the virtual PlayList file (33333.mpls) within the optical disc, in advance, during the manufacturing process of the disc. Alternatively, the virtual clip and the virtual PlayList file may be stored in a local storage (e.g., a memory) in accordance with a user demand. More specifically, in case both the virtual clip (Clip #k) and the virtual PlayList file are recorded within the optical disc in advance, when the user selects the virtual PlayList file, the virtual clip (Clip #k=Clip #1+Clip #2+Clip #3) associated with the selected virtual PlayList file is played-back. Furthermore, in case the virtual clip and the virtual PlayList file are manually created in accordance with the user's demand, the virtual files are stored in a memory (numeral 15 of FIG. 7) of an optical recording and/or reproducing apparatus 10 either temporarily or continuously.

FIG. 5B illustrates detailed examples of the virtual clip (Clip #k) and the virtual PlayList file (33333.mpls). For example, the virtual clip is created to control reproductions of the group of clips (Clip #1, Clip #2, and Clip #3) individually or in combination, and the virtual PlayList file includes a PlayItem and identification information (i.e., PID_Table) in order to control the virtual clip. The PlayItem may designate the virtual PlayList file or the group of clips.

More specifically, for example, Clip #1 includes first and second video streams V1 and V2, a first audio stream A1, and a first graphic stream G1. Clip #2 includes a second audio stream A2, a first subtitle stream S 1, and a second graphic stream G2. And, Clip #3 includes a third audio stream A3, and third and fourth graphic streams G3 and G4. All of these audio, video, graphic, and subtitle streams included in Clip #1, Clip #2, and Clip #3 are referred as elementary streams. At this point, identification information selectively controlling only the elementary streams desired to be played-back among a plurality of elementary streams within the single virtual clip (Clip #k=Clip #1+Clip #2+Clip #3) is included in the virtual PlayList file (33333.mpls) as the PID_Table. Herein, the virtual PlayList may include a single PID_Table or a plurality of PID_Tables.

In other words, FIG. 5B illustrates an example of the virtual PlayList file (33333.mpls) having two PID_Tables (PID_Table 1 and PID_Table 2). However, in another embodiment, the second PID_Table (PID_Table 2) may also be included in another virtual PlayList file (e.g., 44444.mpls)

(not shown), so as to provide a PID_Table in each PlayList. Accordingly, the method of forming the PID_Table will now be described in detail. For example, referring to FIG. 5B, the first PID_Table (PID_Table 1) is formed to playback the first video stream V1, the first audio stream A1, and the first graphic stream G1 included in Clip #1, and the first subtitle stream SI included in Clip #2.

On the other hand, the second PID_Table (PID_Table 2) shown in FIG. 5B is formed to playback the second video stream V2 included in Clip #1, the second audio stream A2 and the second graphic stream G2 included in Clip #2, and the third audio stream A3, and the third and fourth graphic streams G3 and G4 included in Clip #3. Therefore, the user may select any one of the first PID_table (PID_Table 1) and the second PID_Table (PID_Table 2) formed in the virtual PlayList file (33333.mpls), so as to playback the corresponding elementary stream data.

Furthermore, in case only one PID_Table is formed within one virtual PlayList, as described above, wherein the first PID_Table (PID_Table 1) is formed in the virtual PlayList file 33333.mpls, and wherein the second PID_Table (PID_Table 2) is formed in the virtual PlayList file 44444.mpls, the elementary stream data may be automatically reproduced by using the PID_Table as the corresponding virtual PlayList is played-back. Therefore, as shown in the first embodiment of the present invention, by creating the single virtual clip (Clip #k), the virtual PlayList file (33333.mpls), and the control information (PID_Table), the plurality of clips recorded within the optical disc may be played-back and controlled in combination.

Figure 6A:
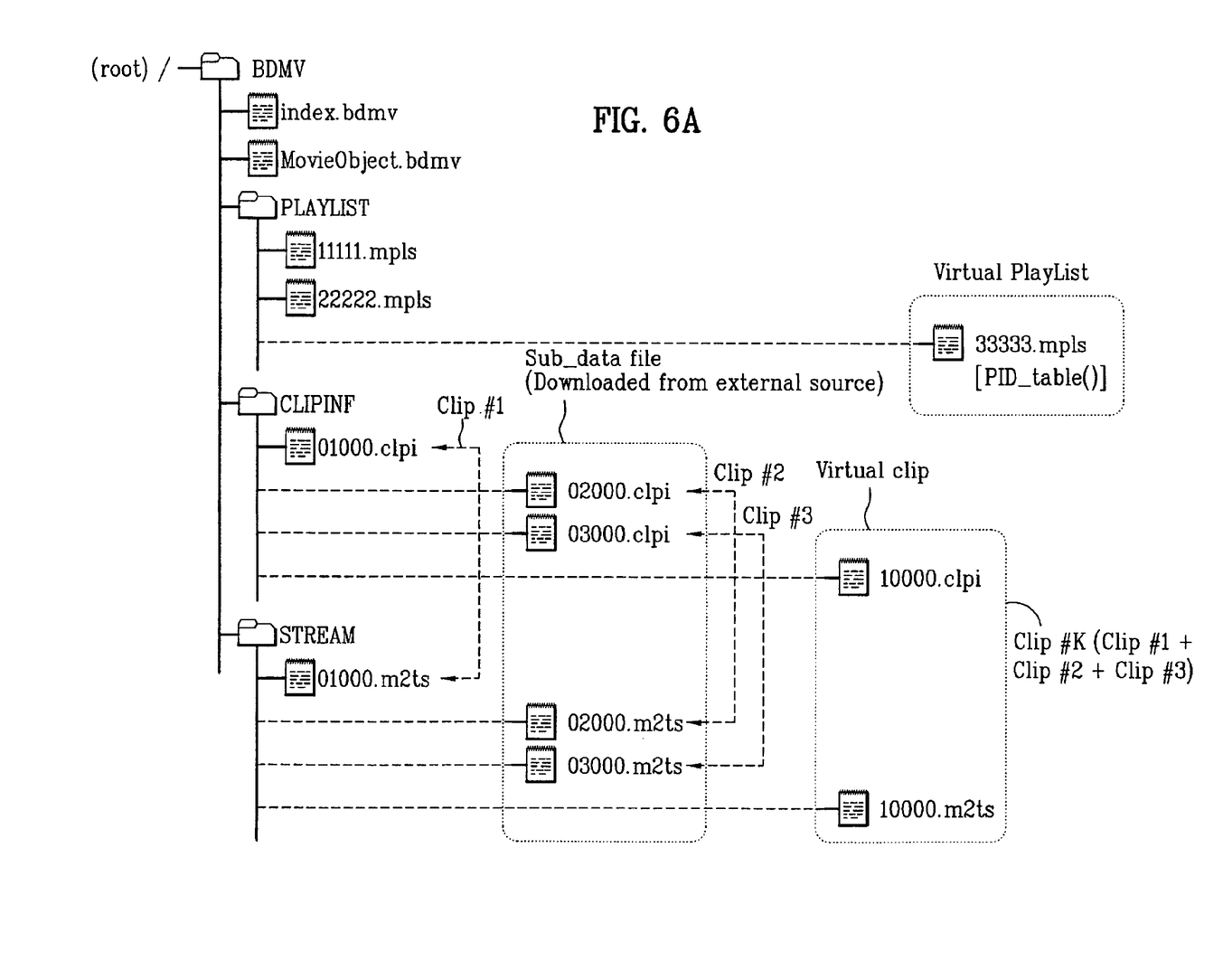
FIGS. 6A and 6B illustrate a method of creating a playback control file for the recording medium according to a second embodiment of the present invention.
Figure 6B:
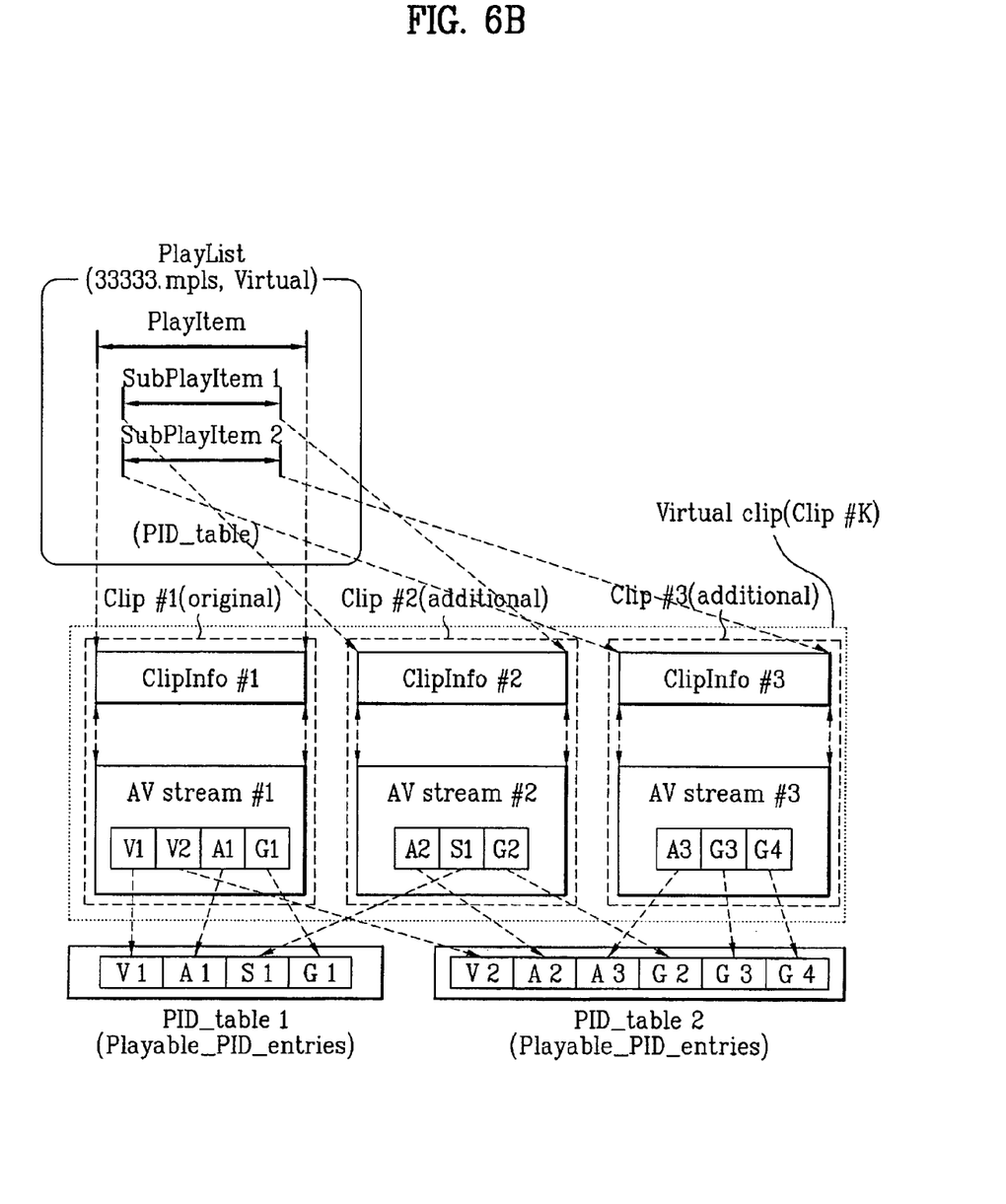

FIGS. 6A and 6B illustrate a method of creating a playback control file for the recording medium according to a second embodiment of the present invention. More specifically, FIGS. 6A and 6B illustrate an example of at least one set of data selected for reproduction, which is downloadable from an external source.

FIG. 6A illustrates a file structure of the data files according to the second embodiment of the present invention, and herein, the same file structure described in FIG. 2 is used for simplicity of the description. Herein, Clip #1 is an original clip recorded within an optical disc, and Clip #2 and Clip #3 are additional clips downloadable from an external source. For example, the additional data (Clip #2 and Clip #3) may be downloaded from the Internet. In the second embodiment according to the present invention, a single virtual clip (Clip #k) is created so as to reproduce the original clip (Clip #1) and the additional clips (Clip #2 and Clip #3) individually or in combination. Moreover, a virtual PlayList file (33333.mpls) including a PID_Table controlling the virtual clip (Clip #k) is also created.

The virtual clip includes a virtual stream file (10000.m2ts) and a virtual clip information file (10000.clpi). The virtual stream file does not include any of the original and additional clips, but it rather includes information (e.g., a list of file names) designating these clips. Similarly, the virtual clip information file does not include any of the clip information files (01000.clpi, 02000.clpi, and 03000clpi) that belong to the original and additional clips, but it rather includes information designating these clip information files.

In addition, predicting the future usage, the manufacturer may record the newly created virtual clip (Clip #k) and the virtual PlayList file (33333.mpls) within the optical disc, in advance, during the manufacturing process of the disc. Alternatively, the newly created virtual clip (Clip #k) and the virtual PlayList file (33333.mpls) may be created in an external source in accordance with a user demand. More specifically, in case both the virtual clip (Clip #k) and the virtual PlayList file (33333.mpls) are recorded in advance within the optical disc, when the user selects the virtual PlayList file (33333.mpls), the additional data (Clip #2 and Clip #3) are downloaded from the external source and used, so as to playback the virtual clip (Clip #k=Clip #1+Clip #2+Clip #3) associated with the selected virtual PlayList file (33333.mpls).

Furthermore, in case the virtual clip (Clip #k) and the virtual PlayList file (33333.mpls) are manually created in accordance with the user's demand, the downloaded additional data and the newly created files (Clip #k and 33333.mpls) are stored in a memory (numeral 15 of FIG. 7) of an optical recording and/or reproducing apparatus 10 temporarily or continuously. On the other hand, when the additional data (Clip #2 and Clip #3) are downloaded, the virtual clip (Clip #k) and the virtual PlayList file (33333.mpls) may also be downloaded from the external source at the same time. This instance is advantageous in that the optical recording and/or reproducing apparatus 10 is not required to newly create the single virtual clip (Clip #k) and the virtual PlayList file (33333.mpls), after downloading the additional data.

FIG. 6B illustrates detailed examples of the virtual clip (Clip #k) and the virtual PlayList file (33333.mpls). For example, the virtual clip is created to control reproduction of a group of clips (Clip #1, Clip #2, and Clip #3), in combination or individually. Herein, the group of clips includes original clips recorded on the disc and additional clips downloadable from the external source. And, the virtual PlayList file includes a PlayItem, two SubPlayItems (SubPlayItem 1, SubPlayItem 2), and identification information (i.e., PID_Table) in order to control the virtual clip (Clip #k). More specifically, the PlayItem may designate the original data (Clip #1), and the SubPlayItems (SubPlayItem 1, SubPlayItem 2) may designate the additional data (Clip #2, Clip #3), respectively. Alternatively, the virtual PlayList file may includes a PlayItem and no SubPlayItem, where the PlayItem directly designates the virtual clip.

Referring back to FIG. 6B, Clip #1 includes first and second video streams V1 and V2, a first audio stream A1, and a first graphic stream G1. Clip #2 includes a second audio stream A2, a first subtitle stream S1, and a second graphic stream G2. And, Clip #3 includes a third audio stream A3, and third and fourth graphic streams G3 and G4. As mentioned above, these audio, video, graphic, and subtitle streams included in Clip #1, Clip #2, and Clip #3 are referred as elementary streams.

In other words, FIG. 6B illustrates an example of the virtual PlayList file (33333.mpls) having two PID Tables (PID_Table 1 and PID_Table 2). However, in another embodiment, the second PID_Table (PID_Table 2) may also be included in another virtual PlayList file (e.g., 44444.mpls) (not shown), so as to provide a PID_Table in each virtual PlayList file, the process of which is described above in the first embodiment of the present invention, shown in FIGS. 5A and 5B. The method of forming the first PID_Table (PID_Table 1) and the second PID_Table (PID_Table 2) is identical to the method described in the first embodiment of the present invention, and a detailed description will, therefore, be omitted for simplicity. More specifically, in the second embodiment of the present invention, by creating the single virtual clip (Clip #k), the virtual PlayList file (33333.mpls), and the control information (PID_Table), the additional data may be downloaded from the external source and be reproduced and controlled in combination with the original data recorded within the optical disc.

Figure 7:
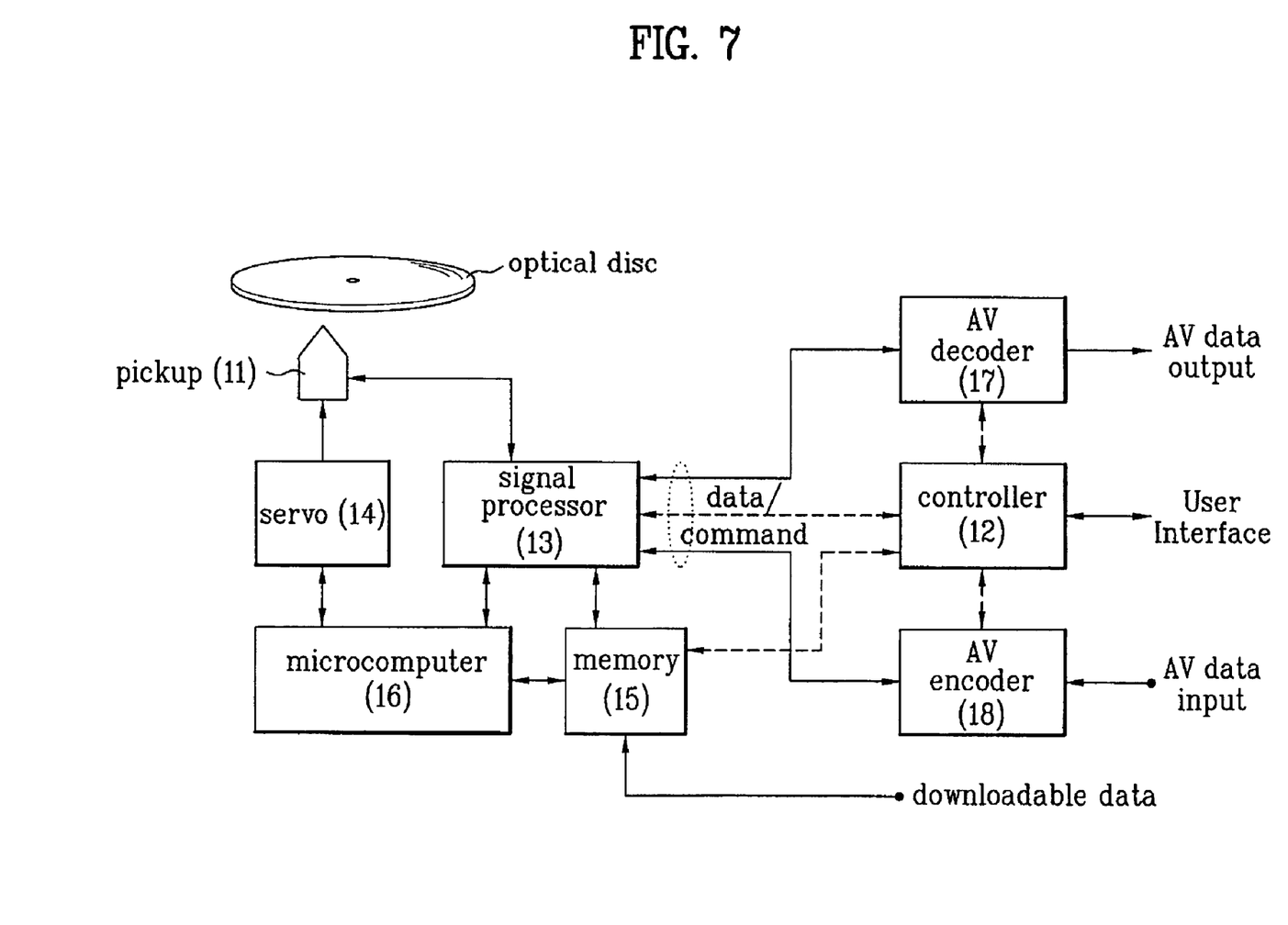
FIG. 7 illustrates an optical recording and/or reproducing apparatus according to the present invention.

FIG. 7 illustrates an optical recording and/or reproducing apparatus 10 according to the present invention, which creates and controls the Virtual PlayList being the playback control file, and which records and reproduces data. The optical recording and/or reproducing apparatus 10 basically includes a pick-up unit 11 for reproducing the control information including the original data and the original PlayList recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

A controller 12 controls all operation of the optical recording and/or reproducing apparatus 10 according to the present invention. More specifically, in case of the first embodiment of the present invention, shown in FIGS. 5A and 5B, the single virtual clip (Clip #k), the virtual PlayList file (33333.mpls), and the control information (PID_Table) recorded within the optical disc are used to reproduce the plurality of stream file data. Alternatively, the reproduction method desired by the user is verified through a user interface, and then appropriate single virtual clip (Clip #k), virtual PlayList file (33333.mpls), and control information (PID_Table) are created and stored in a memory 15 for playback.

Additionally, in case of the second embodiment of the present invention, shown in FIGS. 6A and 6B, the additional data is downloaded from the external source. And, in order to allow the downloaded additional data to be reproduced in combination with the original data recorded within the optical disc, a single virtual clip (Clip #k), a virtual file (33333.mpls), and control information (PID_Table) are created and stored in the memory 15, which are then controlled for playback.

Accordingly, when the single virtual clip (Clip #k), the virtual PlayList file (33333.mpls), and the control information (PID_Table) exist in the external source along with the additional data, and when the controller 12 downloads the additional data from the external source, the single virtual clip (Clip #k), the virtual PlayList file (33333.mpls), and the control information (PID_Table) may also be downloaded at the same time and used for reproduction. In this case, the controller 12 is not required to separately create a new single virtual clip (Clip #k), a new virtual PlayList file (33333.mpls), and new control information (PID_Table). Instead, the information recorded within the optical disc may be used directly.

In the above-described structure, the memory 15 storing additional data and/or files, such as the single virtual clip (Clip #k) and the Virtual PlayList file (33333.mpls), may either use a separate storing means (e.g., a local storage) for further storing purposes, or use a dynamic memory for temporarily storing data. In case the memory uses the separate local storage for further storing purposes, it is preferable that more priority is given when reproducing the optical disc. Furthermore, an AV decoder 17 performs final decoding of output data (i.e., the original data and/or the additional data) depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

As described above, the method of creating a playback control file for a recording medium and the method and apparatus for reproducing data using the playback control file have the following advantages. A plurality of stream files recorded within the recording medium can be played-back in combination, and the data downloaded can also be used in combination, thereby enhancing product efficiency and facilitating the user's use of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of creating a playback control file on an optical recording medium, the method comprising:
   creating, with a controller, a virtual stream file including information designating a group of stream files recorded on the optical recording medium, the virtual stream file not including data included in the group of stream files; and
   creating, with the controller, a PlayList configured to control the virtual stream file to reproduce at least one stream file of the group of stream files, the PlayList including a PlayItem directly designating the virtual stream file and identification information designating at least one elementary stream included in the group of stream files.

2. The method of claim 1, wherein the identification information includes a packet identification (PID) table including packet identifications of the at least one elementary stream included in the group of stream files.

3. The method of claim 1, wherein the identification information includes a packet identification (PID) table including packet identifications of all elementary streams included in the group of stream files.

4. The method of claim 1, wherein the stream identification information includes a packet identification (PID) table including packet identifications of at least two elementary streams included in at least two stream files selected from the group of stream files.

5. The method of claim 1, wherein the identification information includes a plurality of packet identification (PID) tables, each PID table including packet identifications of the at least one elementary stream included in the group of stream files.

6. The method of claim 1, wherein the identification information includes a plurality of packet identification (PID) tables, each PID table including packet identifications of at least two elementary streams included in at least two stream files selected from the group of stream files.

7. A method of creating a playback control file on an optical recording medium, the method comprising:
   creating, with a controller, a virtual stream file designating at least one original stream file recorded on the optical recording medium and at least one additional stream file downloadable from an external source, each original stream file including original elementary streams, and each additional stream file including additional elementary streams; and
   creating, with the controller, a PlayList configured to reproduce at least one of the at least one original stream file and the at least one additional stream file, the PlayList including information designating the virtual stream file and identification information designating at least one of the original and additional elementary streams.

8. The method of claim 7, wherein the identification information includes a packet identification (PID) table including packet identifications of the at least one of the original and additional elementary streams.

9. The method of claim 7, wherein the identification information includes a packet identification (PID) table including packet identifications of all the original and the additional elementary streams.

10. The method of claim 7, wherein the identification information includes a packet identification (PID) table including packet identifications of at least one of the original elementary streams and at least one of the additional elementary streams.

11. The method of claim 7, wherein the identification information includes a first packet identification (PID) table including packet identifications of at least one of the original elementary streams, and a second packet identification (PID) table including packet identifications of at least one of the additional elementary streams.

12. The method of claim 7, wherein the identification information includes a plurality of packet identification (PID) tables, each PID table including packet identifications of the at least one of the original and the additional elementary streams.

13. An optical recording medium storing an executable data structure instructing a processing device to manage data stored on the optical recording medium, comprising:
 a stream area storing a group of stream files and a virtual stream file including information designating the group of stream files, the virtual stream file not including data included in the group of stream files; and
 a PlayList area storing a PlayList configured to control the virtual stream file to reproduce at least one stream file of the group of stream files, the PlayList including a PlayItem directly designating the virtual stream file and identification information designating at least one elementary stream included in the group of stream files.

14. The recording medium of claim 13, wherein the identification information includes at least one packet identification (PID) table including packet identifications of the at least one elementary stream included in the group of stream files.

15. An optical recording medium storing data structures that instruct a processing device to managing data stored on the optical recording medium, comprising:
 a stream area storing at least one original stream file and a virtual stream file, the virtual stream file designating the at least one original stream file and at least one additional stream file downloadable from an external source, each original stream file including original elementary streams, and each additional stream file including additional elementary streams; and
 a PlayList area storing a PlayList configured to reproduce at least one of the at least one original stream file and the at least one additional stream file, the PlayList including information designating the virtual stream file and identification information designating at least one of the original and the additional elementary streams.

16. The recording medium of claim 15, wherein the identification information includes at least one packet identification (PID) table including packet identifications of at least one of the original and the additional elementary streams.

17. A method of reproducing data recorded on an optical recording medium, the method comprising:
 creating, with a reproducing apparatus, a virtual stream file including information designating a group of stream files recorded on the optical recording medium, the virtual stream file not including data included in the group of stream files;
 creating, with the reproducing apparatus, a PlayList including a PlayItem directly designating the virtual stream file and identification information designating at least one elementary stream included in the group of stream files; and
 playing-back, with the reproducing apparatus, the PlayList so as to control the virtual stream file to reproduce at least one of the group of stream files.

18. A method of reproducing data recorded on an optical recording medium, the method comprising:
 downloading, with the reproducing apparatus, at least one additional stream file from the external source;
 creating, with the reproducing apparatus, a virtual stream file designating at least one original stream file recorded on the optical recording medium and the at least one additional stream file downloaded from an external source, the at least one original stream file including original elementary streams, and the at least one additional stream file including additional elementary streams;
 creating, with a reproducing apparatus, a PlayList including information designating the virtual stream file and identification information designating at least one of the original and the additional elementary streams; and
 playing-back, with the reproducing apparatus, the PlayList so as to reproduce at least one of the at least one original stream file and the at least one additional stream file.

19. The method of claim 18, wherein the PlayList includes a PlayItem designating the original stream file and a SubPlayItem designating the additional stream file.

20. The method of claim 18, wherein the identification information includes a single packet identification (PID) table including packet identifications of the at least one of the original and additional elementary streams.

21. The method of claim 18, wherein the identification information includes a first packet identification (PID) table including packet identifications of at least one of the original elementary streams, and a second packet identification (PID) table including packet identifications of at least one of the additional elementary streams.

22. An apparatus for reproducing data recorded on an optical recording medium, the apparatus comprising:
 a controller configured to create a virtual stream file including information designating a group of stream files recorded on the optical recording medium, the virtual stream file not including data included in the group of stream files, and configured to create a PlayList including a PlayItem directly designating the virtual stream file and identification information designating at least one elementary stream included in the group of stream files, wherein the controller plays-back the PlayList so as to control the virtual stream file to reproduce at least one stream file of the group of stream files.

23. An apparatus for reproducing data recorded on an optical recording medium, the apparatus comprising:
 a data storage configured to store at least one additional stream file downloaded from an external source; and
 a controller configured to create a virtual stream file designating at least one original stream file recorded on the optical recording medium and the at least one additional stream file, each original stream file including original elementary streams, and each additional stream file including at least one additional elementary stream, the controller being further configured to create a PlayList including information designating the virtual stream file and identification information designating at least one of the original and the additional elementary streams, wherein the controller plays-back the PlayList so as to reproduce at least one stream file of the group of stream files.

24. The apparatus of claim 23, wherein the controller is configured to create the PlayList including a PlayItem and a SubPlayItem, the PlayItem designating the original stream file and the SubPlayItem designating the additional stream file.

25. The apparatus of claim 23, wherein the controller is configured to create the identification information including a single packet identification (PID) table including packet identifications of the at least one of the original and the additional elementary streams.

26. The apparatus of claim 23, wherein the controller is configured to create the identification information including a first packet identification (PID) table including packet identifications of at least one of the original elementary streams, and a second packet identification (PID) table including packet identifications of at least one of the additional elementary streams.

* * * * *